July 24, 1956

E. E. MEUSY 2,756,370

ELECTROMAGNETIC CONTROL DEVICE WITH MANUAL
OPERATOR AND ELECTRORESPONSIVE RELEASE

Filed Oct. 28, 1952

Inventor:
Eugene E. Meusy
By
Attys.

July 24, 1956

E. E. MEUSY 2,756,370

ELECTROMAGNETIC CONTROL DEVICE WITH MANUAL
OPERATOR AND ELECTRORESPONSIVE RELEASE

Filed Oct. 28, 1952

Inventor:
Eugene E. Meusy
By
Attys.

United States Patent Office 2,756,370
Patented July 24, 1956

2,756,370

ELECTROMAGNETIC CONTROL DEVICE WITH MANUAL OPERATOR AND ELECTRORESPONSIVE RELEASE

Eugene E. Meusy, Milwaukee, Wis., assignor to Milwaukee Gas Specialty Company, Milwaukee, Wis., a corporation of Wisconsin Application October 28, 1952, Serial No. 317,281

15 Claims. (Cl. 317—123)

This invention relates to control devices, and more particularly to those of the type which include an electromagnetic operator having utility in the operation of valves or the like for controlling the flow of fluids, for example, the flow of fluid fuel for fluid fuel burning apparatus responsive to change in temperature or other condition.

The copending application of Floyd J. Bydalek and Russell B. Matthews, Case 1, Serial No. 270,666, filed February 8, 1952, discloses and claims an electromagnetic control device employing electric energy or power from a commercial source and which includes a valve which, for example, is opened to establish flow of fuel for fluid fuel burning apparatus when a thermostat is calling for heat and closes to interrupt the flow of fuel when the thermostat is satisfied, thus providing an automatic control for maintaining, for example, a desired temperature.

Upon failure of the electric energy or power for devices of the aforementioned character, the valve closes shutting off the supply of fuel and may remain closed for an extended period of time. As a result, there may be considerable human discomfort and other objectionable results attendant to such power failure, particularly during severe weather conditions such as might prevail during the winter when storms may disrupt the supply of electric power in certain areas. At such time a condition of this character might even be dangerous.

One of the main objects of the present invention is to provide improved means for manually operating, for example, the armature of an electromagnetic operator with accompanying movement of the valve or the like to flow permitting position upon failure of the supply of power or electric energy and for maintaining the armature and valve in the positions to which they are thus operated with means for returning the armature and valve to automatic or power control upon resumption of power or electric energy.

Another object is to provide an improved manual operator with electroresponsive release particularly adapted for application to and use with electromagnetic control devices, in general, of the character disclosed and claimed in the aforementioned copending application of Floyd J. Bydalek and Russell B. Matthews.

Another object is to provide a manual operator which is operated by turning movement and has novel coaction with a rotary armature or rotor of the electromagnetic control device not only for manually turning the armature with accompanying movement of the valve to flow permitting position but for holding or maintaining the armature in the position to which it is thus operated and the valve in corresponding position.

Another object is to provide a manual operator having means actuated by the turning movement of the operator for completing an electric circuit for the electromagnetic operator so that the means for maintaining the armature and valve in the positions to which they are manually operated will be released and the armature and valve returned to automatic or power control upon resumption of power or electric energy and regardless of the condition of the thermostat or other condition responsive device.

Another object is to provide a device in which the circuit completed by the operation of the manual operator is the secondary circuit for a secondary winding for diverting magnetic flux established in the magnetic frame of the electromagnetic control device by energization of a primary winding and wherein the windings and magnetic frame constitute a current limiting step-down transformer in which the electric energy produced in the secondary winding may be relatively low and substantially constant, so that not only the secondary circuit and condition responsive means but also the switch under control of the manual operator will not be deleteriously affected by the energizing current supplied to the primary winding and so that the type of insulation required for line voltages is unnecessary.

Further objects and advantages of the invention will appear from the following detailed description taken in connection with the accompanying drawings wherein the electromagnetic control device is illustrated as a valve operator, it being understood that the invention is limited only within the scope of the appended claims.

Figure 1:
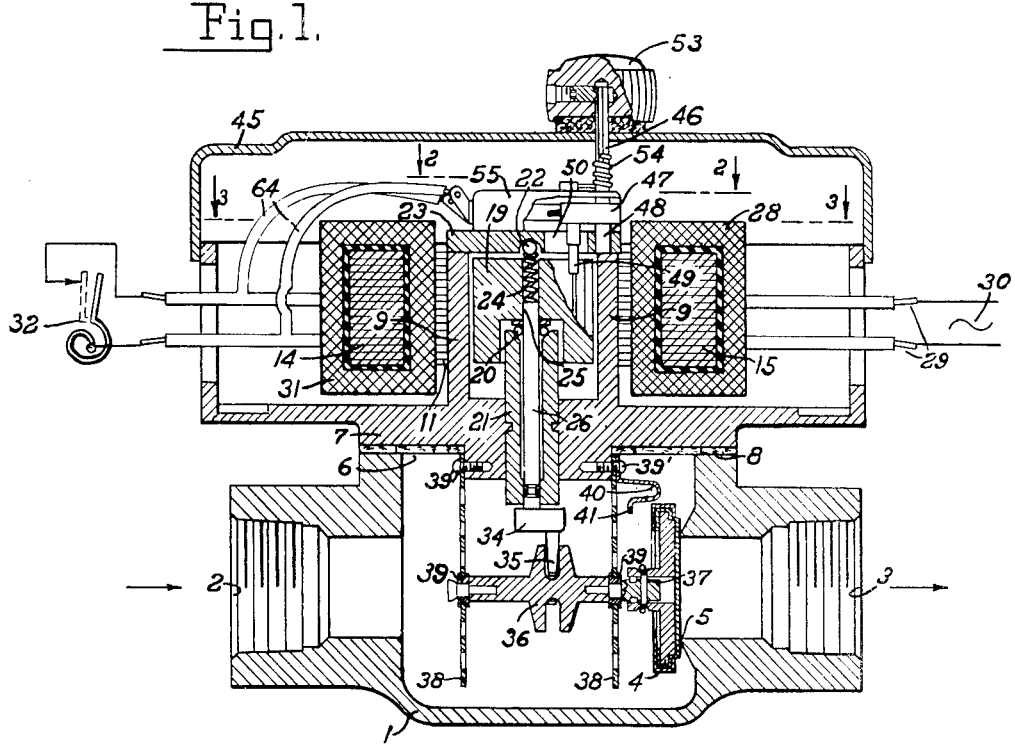
Figure 1 is an axial sectional view of one form of electromagnetic control device showing one form of manual operator and electroresponsive release embodying the present invention applied thereto.

Referring to the drawings, the control selected for illustration comprises an electromagnetically operated valve which may, for example, be of the form, in general, illustrated in the copending application of Floyd J. Bydalek and Russell B. Matthews, Serial No. 270,666, filed February 8, 1952.

The details of the electromagnetic valve operating means may be ascertained more fully by reference to the aforementioned copending application. Suffice it for purposes of the present application to state that the illustrated form of control comprises a valve body 1 having a fluid inlet 2 and a fluid outlet 3. A valve member 4 cooperates with a valve seat 5 at the outlet 3 to control the flow of fluid through the valve, for example, the flow of gaseous fuel to a burner (not shown) or any other fluid.

The valve body 1 has an opening 6 covered by an enclosure 7 for the electromagnetic operating means, the bottom wall of the enclosure forming a plate-like cover for the opening 6 and being secured in place, for example, by screws (not shown) threaded into the valve body 1. Sealing means 8 is preferably interposed between the enclosure 7 and valve body 1 to render the connection fluidtight. The enclosure 7 is preferably a die casting of non-magnetic material such as aluminum.

Figure 3:
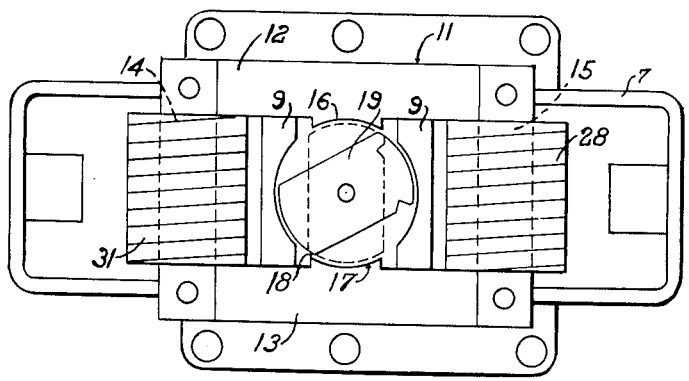
Figure 3 is a view taken substantially on the line 3—3 of Figure 1 with the cover of the electromagnetic control device removed.

The upper side of enclosure 7 is provided with a pair of integrally formed upstanding arms 9 of configuration best shown in Figure 3 forming a partial enclosure for a rotor or rotary armature 19.

Mounted on the plate-like cover portion of the enclosure 7 is a power unit comprising a magnetic core 11 of laminated or other suitable form. The particular core or magnetic frame selected for illustration is of generally rectangular configuration comprising a pair of parallel side legs 12 and 13 magnetically connected by parallel end legs 14 and 15. Integrally formed on the side legs 12 and 13 of the core 11 are pole faces 16 and 17 defining between them an air gap 18 in which a magnetic armature or rotor 19 is adapted to be drawn.

The rotor 19 is of magnetic material such as steel and is shown in solid form positioned for turning movement between bearings as illustrated by the bearing at 20 between the bottom of the rotor 19 and the upper end of a sleeve 21 carried by the base plate part of the enclosure 7 and by a thrust bearing 22. The thrust bearing 22 is carried by a bearing plate 23 mounted on the upper ends of the arms 9 and comprises a ball and compression spring 24 trapped in an axial recess in the rotor 19. The rotor 19 is fixed, for example, at 25 to a shaft 26 so that the shaft 26 will turn with turning movement of the rotor.

The thrust bearing comprising the spring 24 and ball 22 keeps the tapered ball bearing 20 under compression. This eliminates any free play between the shaft 26 and bearing tube 21, thereby eliminating noise normally brought about by magnetic flux alternation.

The electromagnetic operator further comprises a primary winding 28 adapted to be connected to a suitable source of electric energy, for example, by conductors 29 to a source of alternating current indicated symbolically at 30. The winding 28 is carried on one of the end legs of the core or magnetic frame and the other end leg carries a secondary winding 31, the circuit of which includes condition responsive means such as a thermostat 32. It will be understood that when the primary winding is energized and the secondary circuit is open, the magnetic flux created in the core 11 by energization of the primary winding 28 will tend to flow around the core through the end leg 14 in preference to jumping the air gap 18 between the pole faces 16 and 17, whereas when the secondary circuit is closed, induced currents in the secondary winding 31 will divert the magnetic flux across the air gap to cause turning movement of the rotor 19 from the position shown in full lines in Figure 3 and in dotted lines in Figure 4 or from the position shown in dotted lines in Figure 2 to the position shown in dotted lines in Figure 3.

As shown in Figure 1, the shaft 26 connected to the rotor 19 extends downwardly from the sleeve 21 into the interior of the valve body 1 and is connected to a crank member 34. The crank member 34 is non-rotatably connected to the shaft 26 and has an off center pin 35 which engages a yoke 36 connected at one end at 37 to the valve member 4.

The yoke-valve assembly is suspended in the valve body 1, for example, by a pair of springs 38 having their outermost turns attached as by screws 39' to the enclosure 7. The springs 38 serve both to support the valve member assembly in alignment with the valve seat 5 and to bias the rotor 19 to the position shown in full lines in Figure 3 and valve member 4, for example, to closed position. The springs 38 are of flat spiral configuration in plan and conical helically in side elevation when uncompressed. That is to say, when the turns are in a plane as shown in Figure 1, they are under compression and imparting a sealing force to valve member 4 against its valve seat 5. Movement of the valve member 4 to open position against the bias of springs 38 further compresses them. The innermost turns of the springs 38 are attached to the yoke assembly at 39.

A resilient damping arm 40 of hairpin or U-shaped configuration is attached at one end at 39' to the enclosure 7. The opposite end of this spring or resilient arm has a downturned end 41 and the arm 40 cooperates with the valve member 4 for damping the movement thereof as it moves to open position. The arm 40 creates a friction point which eliminates vibration and noise caused by alternating magnetic flux when the operating unit is under load.

The control device is provided with a cover 45 preferably of non-magnetic material and suitable form and extending for turning movement through an opening in this cover is the shaft 46 of the manual operator. The inner end of the shaft 46 is non-rotatably connected to a crank 47 which has a pivot pin 48 which turns in a bearing opening in the bearing plate 23. The crank 47 carries an off center pin 49 which extends downwardly through an opening 50 in the bearing plate 23 for coaction with the side 51 of the rotor 19. The ends of the rotor 19 are arcuately formed at 52 as are the pole faces 16 and 17. The outer end of the shaft 46 has a handle 53 non-rotatably secured thereto so that by grasping the handle the shaft 46 may be manually turned.

Figure 4:
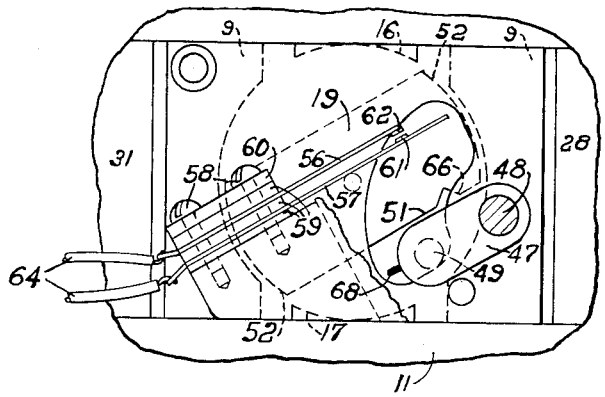
Figure 4 is a view similar to Figure 2 showing the armature in the position to which it is returned upon deenergization and the manual operator in released position.

The crank 47 and shaft 46 are biased to the position in which the crank is shown in Figure 4 by a spring 54 coiled about the shaft 46 and anchored to the shaft at one end and at its opposite end, for example, to a contact spring support 55 mounted on the bearing plate 23. The support 55 carries a pair of spring contact leaves 56 and 57 secured to the support 55, for example, by screws 58 with insulating strips 59 interposed between the spring 57 and support 55, between springs 56 and 57 and between spring 56 and attachment plate 60. The spring 57 carries a contact 61 which is biased out of contact with a contact 62 carried by spring 56 when the manual operator is released. The springs 57 and 56 are connected to the secondary circuit in shunt with the terminals of thermostat 32 by conductors 64 so that when the contacts 61 and 62 are in contact the circuit for the secondary winding 31 will be closed regardless of the condition of the thermostat.

Figure 2:
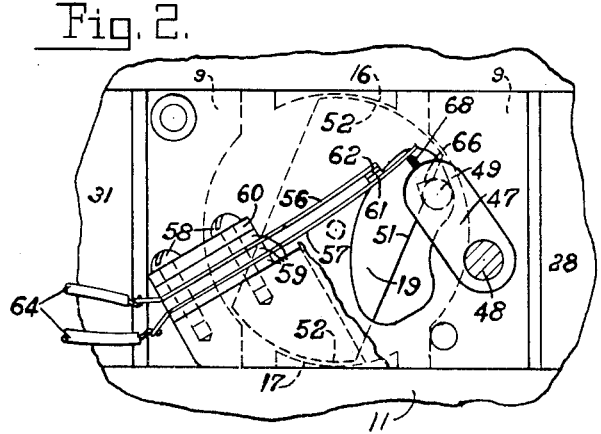
Figure 2 is a fragmentary view taken substantially on the line 2—2 of Figure 1 with the armature in the position to which it is turned by the manual operator and the manual operator positioned to maintain the armature in the illustrated position.

For the purpose of retaining the rotor 19 and valve member 4 in the positions to which they are moved by the manual operator which positions are intermediate positions short of the positions to which they are moved by the electromagnetic operator as shown by the dotted line position of the rotor 19 in Figure 2, the side 51 of the rotor 19 is provided with a vertically extending V-shaped notch 66 for coaction with the off center pin 49 as shown particularly in Figure 2.

For the purpose of closing the contact 61 into contact with contact 62 by turning movement of the manual operator, the crank 47 carries an insulating nib 68 which engages spring leaf 57 and presses contact 61 into contact with contact 62 as the crank 47 is turned to the position shown in Figure 2. This closes the circuit for the secondary winding 31 regardless of the condition of the thermostat.

The operation of the illustrated embodiment of the invention is as follows:

Assuming the primary winding 28 to be energized by electric energy from the source 30, magnetic flux will be created in the core 11 and will flow through the leg 14 as long as the circuit of secondary winding 31 remains open. The rotor 19 is disposed as shown in full lines in Figure 3 and in dotted lines in Figure 4 at this time with the valve 4, for example, in closed position. This position of the rotor is determined by the bias afforded by the springs 38 which also support and bias the valve 4 to closed position.

When the circuit of secondary winding 31 is closed, as, for example, by closure of the contacts of the thermostat 32, the magnetic flux of core 11 will no longer flow through the leg 14 thereof but will be diverted to the pole faces 16 and 17. Since the flux will cross the air gap 18 at the point of minimum air gap and since the minimum air gap occurs at the points where the leading edges of the rotor 19 are presented to the pole faces, the magnetic flux will be concentrated at these points and will turn the rotor from the position shown in full lines to the position shown in dotted lines in Figure 3.

In the event of failure of electric energy or power from the source 30, the rotor 19 remains in or returns to the position shown in full lines in Figure 3 under the bias of the springs 38 depending upon whether the thermostat contacts are open or closed. Now, when it is desired manually to open the valve 4, the handle or finger piece 53 is grasped and turned to turn crank 47 in a clockwise direction from the position shown in Figure 4 to the position shown in Figure 2. In this movement of the crank, the pin 49 by engagement with the side 51 of rotor 19 turns the rotor from the position shown in Figure 4 to the intermediate position shown in Figure 2. This movement of rotor 19 to intermediate position moves valve 4 to an intermediate flow permitting position. The movement of crank 47 to the position shown in Figure 2 causes the nib 68 to close the contact 61 into contact with the contact 62.

As the crank 47 reaches the position shown in Figure 2, the pin 49 engages in the notch 66 and by such engagement holds the rotor in this position and thereby the valve in corresponding flow permitting position. Due to the engagement of pin 49 in notch 66, it will be noted that the rotor will be turned counterclockwise slightly beyond the position shown in dotted lines in Figure 2 in manual operation and will move slightly clockwise in engagement of the notch 66 with the pin 49.

Now, upon resumption of electric energy or power from the source 30, the currents induced in the secondary winding 31 divert the magnetic flux through the air gap to cause turning movement of the rotor 19 from the position shown in dotted lines in Figure 2 to the position shown in dotted lines in Figure 3 with accompanying movement of valve 4 to full open position. The movement of the rotor from the position shown in Figure 2 to the position shown in Figure 3 releases the notch 66 from engagement with the pin 49 and the manual operator returns to the position indicated by the crank 47 in Figure 4 under the bias of the spring 54. The rotor 19 and valve 4 are thus automatically returned to automatic or power control upon resumption of electric energy from the source 30 and the manual operator is returned to position for subsequent manual operation.

The embodiment of the invention shown in the drawings is for illustrative purposes only and it is to be expressly understood that said drawings and the accompanying specification are not to be construed as a definition of the limits or scope of the invention, reference being had to the appended claims for that purpose.

I claim:

1. In a device of the class described, an electromagnetic operator for energization by a source of electric energy and having an armature mounted for turning movement about an axis, said armature being biased to a first position and positioned to be turned to a second position by said electromagnetic operator, condition responsive means controlling the actuation of said armature by said electromagnetic operator, a manual operator for turning said armature from said first position to an intermediate position, retention means rendered operative to retain said armature in said intermediate position by turning movement of said armature to said intermediate position, and means actuated by said manual operator in turning said armature to said intermediate position for completing an electric circuit for said electromagnetic operator in shunt with said condition responsive means so as, upon resumption of electric energy from said source, after failure thereof, to turn said armature to its second position beyond said intermediate position, said retention means being released by movement of said armature from its intermediate position to its second position.

2. In a device of the class described, an electromagnetic operator comprising a permeable core having an air gap, a winding which when energized by a source of electric energy is adapted to produce magnetic flux in said core, a magnetic armature mounted for turning movement about an axis and positioned with respect to said air gap so as to be actuated by said magnetic flux with resultant turning movement of said armature from a first position to a second position, condition responsive means controlling actuation of said armature by said electromagnetic operator, a manual operator for turning said armature from said first position to an intermediate position, retention means rendered operative to retain said armature in said intermediate position by turning movement of said armature to said intermediate position, and means actuated by said manual operator in turning said armature to said intermediate position for completing an electric circuit for said electromagnetic operator in shunt with said condition responsive means so as, upon resumption of electric energy from said source, after failure thereof, to turn said armature to its second position beyond said intermediate position, said retention means being released by movement of said armature from its intermediate position to its second position.

3. In a device of the class described, an electromagnetic operator comprising a permeable core affording a closed magnetic circuit and having pole pieces defining an air gap, means comprising a winding for energization by a source of electric energy for producing magnetic flux in said core adapted to flow in said magnetic circuit, means for diverting said flux from said closed circuit to cause said flux to flow through said air gap, a magnetic rotor having its axis of rotation in said air gap and adapted to be drawn into said air gap from a first position to a second position when flux is diverted through said air gap, condition responsive means controlling the diversion of flux through said air gap by said flux diverting means, a manual operator for turning said armature into said air gap to an intermediate position, retention means rendered operative to retain said armature in said intermediate position by said turning movement of said armature to said intermediate position, and means actuated by said manual operator in turning said armature to said intermediate position for rendering said flux diverting means effective to divert said flux through said air gap upon resumption of electric energy from said source after failure thereof, whereby to turn said rotor to its second position and sufficiently beyond said intermediate position to satisfy the inherent tendency of said flux to minimize the air gap through which it is forced to flow, said retention means being released by movement of said rotor from its intermediate position to its second position.

4. In a device of the class described, an electromagnetic operator including a permeable core having an air gap, a winding which when energized by a source of electric energy is adapted to produce magnetic flux in said core, a second winding on said core having a circuit controlled by a thermostat for controlling the shunting of said magnetic flux through said air gap, a magnetic rotor positioned to be turned from a first position to a second position when flux is shunted through said air gap, a manual operator for turning said rotor from its first position to an intermediate position, retention means operative upon movement of said rotor to intermediate position to hold said rotor in said intermediate position, and means completing an electric circuit for said second winding in shunt with said thermostat when said rotor is in said intermediate position so as, upon resumption of electric energy from said source, after failure thereof, to turn said rotor to said second position, said retention means being released by movement of said rotor from its intermediate position to its second position with resultant return of said circuit for said second winding to control by said thermostat.

5. In a device of the class described, an electromagnetic operator for energization by a source of electric energy and having an armature mounted for turning movement about an axis, said armature being biased to a first position and positioned to be turned to a second position by said electromagnetic operator, a manual operator comprising a pivoted lever biased to turn in one direction to a first position and carrying an eccentric part coacting with said armature to turn said armature to an intermediate position by turning movement of said lever in the opposite direction, said armature having a retention portion coacting with the eccentric part carried by said lever to retain said armature in said intermediate position, and means effective when said armature is in said intermediate position for placing said armature under control of said electromagnetic operator so as to cause said electromagnetic operator to turn said armature to said second position upon resumption of electric energy from said source after failure thereof, said retention portion of said armature being released from the eccentric part carried by said lever by movement of said armature from its intermediate position to its second position.

6. In a device of the class described, an electromagnetic operator for energization by a source of electric energy and having an armature mounted for turning movement about an axis, said armature being biased to a first position and positioned to be turned to a second position by said electromagnetic operator, a manual operator comprising a pivoted lever biased to turn in one direction to a first position and carrying an eccentric pin coacting with said armature to turn said armature to an intermediate position by turning movement of said lever in the opposite direction, said armature having a notch in which said pin is engageable to retain said armature in said intermediate position, a switch under control of said lever for placing said armature under control of said electromagnetic operator when said armature is in said intermediate position so as to cause said electromagnetic operator to turn said armature to said second position upon resumption of electric energy from said source after failure thereof, the notch in said armature being released from said eccentric pin by movement of said armature from its intermediate position to its second position.

7. In a device of the class described, an armature mounted for turning movement and biased to a first position, a manual operator mounted for turning movement and having armature actuating means coacting with said armature for turning same from said first position to an intermediate position, said armature having retention means thereon coacting with said armature actuating means for retaining said armature in said intermediate position, and power operated means for turning said armature to a second position beyond said intermediate position, said retention means being released by movement of said armature from its intermediate position to its second position by said power operated means.

8. In a device of the class described, an armature mounted for turning movement and biased to a first position, a manual operator mounted for turning movement and including a crank having an off center pin coacting with said armature for turning same from said first position to an intermediate position, said armature having a notch in the surface thereof coacting with said eccentric pin for retaining said armature in said intermediate position, and power operated means for turning said armature to a second position beyond said intermediate position, said notch being released from said pin by movement of said armature from its intermediate position to its second position by said power operated means.

9. In a device of the class described, an armature mounted for turning movement and biased to a first position, a manual operator mounted for turning movement and including a crank having an off center pin coacting with said armature for turning same from said first position to an intermediate position, said armature having a notch in the surface thereof coacting with said eccentric pin for retaining said armature in said intermediate position, power operated means for turning said armature to a second position beyond said intermediate position, said notch being released from said pin by movement of said armature from its intermediate position to its second position by said power operated means, and a switch actuated to closed position to complete a circuit for said power operated means by movement of said armature from said first position to said intermediate position.

10. In a device of the class described; an armature mounted for turning movement between a first position and a second position; and releasable armature actuating and retaining means, said means being movable between an inoperative position toward which it is normally biased and an operative position, movement of said means from said inoperative position toward said operative position causing actuation of said armature and rotation of the latter to an intermediate position in which it is retained by said means when said means reaches said operative position, said actuating and retaining means being released and thereupon returned to said inoperative position in response to movement of said armature beyond said intermediate position.

11. In a device of the class described, an armature mounted for turning movement between a first position and a second position and biased to said first position, an armature actuating and retaining member biased to an inoperative position, said member being manually operable to operative position and co-acting with said armature to move said armature to an intermediate position by said manual operation, said member being effective to retain said armature in said intermediate position, and power operated means effective to move said armature from said first position to said second position and from said intermediate position to said second position, said member being released from retaining said armature in said intermediate position by the movement of said armature from said intermediate position to said second position by said power operated means.

12. In a device of the class described, an armature mounted for turning movement between first and second positions, operating means for said armature operable to effect disposition of the latter in said second position, and releasable armature actuating and retaining means, said actuating and retaining means being movable between an inoperative position toward which it is biased and an operative position, movement of said actuating and retaining means toward said operative position causing turning movement of said armature to an actuated position in which it is retained by said means, said actuating and retaining means being released and thereupon returned to said inoperative position by said bias upon operation of said operating means for disposition of said armature in its said second position.

13. In a device of the class described, a control member mounted for turning movement between a first position and a second position, releasable actuating and retaining means for said control member biased toward an inoperative position and movable toward an operative position, movement of said means toward said operative position causing rotation of said control member toward an actuated position in which it is retained by said means when the latter reaches said operative position, power operated means operable when energized to effect disposition of said control member in said second position, and a switch actuated to closed position to complete a circuit for said power operated means by movement of said actuating and retaining means toward said operative position to effect on energization of said circuit, disposition of said control member in said second position and release of said actuating and retaining means.

14. In a device of the class described, an armature mounted for turning movement, electrical operating means for said armature including power source means to effect turning of said armature from a first position to a second position, manual actuating means operable from an inoperative position toward an operative position upon failure of said source means to effect movement of said armature from its said first position toward its said second position, and circuit controlling means in circuit with said operating means and movable from an inoperative position toward an operative position by corresponding movement of said actuating means to insure operation of said electrical operating means immediately upon resumption of power from said power source means.

15. In a device of the class described, an armature mounted for turning movement, electrical operating means for said armature including power source means and first switch means operable from open circuit to closed circuit position to effect movement of said armature from a first position to a second position, manual actuating means operable from an inoperative position to an operative position upon failure of said source means to effect movement of said armature from its said first position to its said second position, and second switch means in circuit with said electrical operating means and movable from open circuit to closed circuit position by operation of said actuating means from its inoperative to its operative position to thereby insure operation of said electrical operating means immediately upon resumption of power from said power source means irrespective of the position of said first switch means.

References Cited in the file of this patent

UNITED STATES PATENTS

| | | | |
|---|---|---|---|
| 1,533,770 | Shaw | Apr. 14, | 1925 |
| 2,245,834 | Sparrow | June 17, | 1941 |
| 2,358,999 | Ray | Sept. 26, | 1944 |
| 2,442,877 | Ray | June 8, | 1948 |
| 2,476,419 | Koenig | July 19, | 1949 |
| 2,622,622 | Ray | Dec. 23, | 1952 |